United States Patent
Zafarana et al.

(10) Patent No.: US 8,305,062 B2
(45) Date of Patent: Nov. 6, 2012

(54) METHOD FOR CONTROLLING A VOLTAGE REGULATOR, IN PARTICULAR A CONVERTER OF THE MULTIPHASE INTERLEAVING TYPE AND CORRESPONDING CONTROLLER

(75) Inventors: Alessandro Zafarana, Milan (IT); Osvaldo Enrico Zambetti, Milan (IT); Andrea Cappelletti, Capiago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 214 days.

(21) Appl. No.: 12/483,063

(22) Filed: Jun. 11, 2009

(65) Prior Publication Data

US 2009/0309564 A1    Dec. 17, 2009

(30) Foreign Application Priority Data

Jun. 13, 2008    (IT) .............................. MI2008A1066

(51) Int. Cl.
 *G05F 1/00*    (2006.01)
(52) U.S. Cl. ....................................................... 323/283
(58) Field of Classification Search .................. 323/283, 323/282, 224, 288
 See application file for complete search history.

(56) References Cited

U.S. PATENT DOCUMENTS

| | | | |
|---|---|---|---|
| 4,959,764 A | 9/1990 | Bassett | |
| 5,180,964 A | 1/1993 | Ewing | |
| 5,691,628 A * | 11/1997 | Martin | 323/237 |
| 5,814,976 A * | 9/1998 | Allison | 323/224 |
| 6,806,689 B2 | 10/2004 | Schuellein et al. | |
| 7,102,340 B1 | 9/2006 | Ferguson | |
| 7,180,273 B2 * | 2/2007 | Bocchiola et al. | 323/207 |
| 7,321,210 B2 | 1/2008 | Wood | |
| 7,368,897 B2 * | 5/2008 | Qahouq et al. | 323/282 |
| 7,382,114 B2 | 6/2008 | Groom | |
| 7,538,534 B2 * | 5/2009 | Mednik et al. | 323/285 |

FOREIGN PATENT DOCUMENTS

| | | |
|---|---|---|
| EP | 1826893 | 8/2007 |
| EP | 1826894 | 8/2007 |

OTHER PUBLICATIONS

Juanjuan Sun, Fred C. Lee, Ming Xu, Yang Qiu, "Modeling and Analysis for Beat-Frequency Current Sharing Issue in Multiphase Voltage Regulators", IEEE 2007, pp. 1542-1548.
Osvaldo Zambetti and Alessandro Zafarana, "Load Transient Boost technology to improve the performance of multiphase controllers with the load frequency variations" at PCIM Europe 2007 Conference, pp. 5.

(Continued)

*Primary Examiner* — Shawn Riley
(74) *Attorney, Agent, or Firm* — Graybeal Jackson LLP

(57) ABSTRACT

An embodiment of method is described for controlling a voltage regulator of the type comprising at least one modulator of the PWM type, the method comprising:
1) generation of a control voltage signal for said PWM modulator;
2) frequency modulation of said control voltage signal obtaining a modulated control voltage signal having an harmonic at a switching frequency of said voltage regulator of reduced entity with respect to said control voltage signal; and
3) application of said modulated control voltage signal to said PWM modulator for generating a driving signal for said voltage regulator.

38 Claims, 8 Drawing Sheets

OTHER PUBLICATIONS

Osvaldo Zambetti and Alessandro Zafarana, "Load Transient Boost "LTB Technology" Applied to Multiphase DC-DC Converters" at power Electronics World Conference 2006 (pp. 15).

Pit-Leong Wong "Performance Improvements of Multi-Channel Interleaving Voltage Regulator Modules with Integrated Coupling Inductors" PhD Thesis at Faculty of the Virginia Polytechnic Institute and State University, Mar. 28, 2001 (pp. 224).

Juanjuan Sun, Fred C. Lee, Ming Xu, Yang Qiu, "Dynamic Current Sharing Analyses for Multiphase Buck VRs" IEEE 2006, Trans. Power Electron pp. 31-37.

J. Balcells, D. Gonzales, J. Gago, A. Santolaria, Jean C. Le Bunetel, D. Magnon, S. Brehaut, "Frequency Modulation Techniques for EMI Reduction in SMPS" Power Electronics and Applications, 2005 European Conference Sep. 11-14, 2005, pp. 8.

\* cited by examiner

METHOD FOR CONTROLLING A VOLTAGE REGULATOR, IN PARTICULAR A CONVERTER OF THE MULTIPHASE INTERLEAVING TYPE AND CORRESPONDING CONTROLLER

PRIORITY CLAIM

The present application claims the benefit of Italian Patent Application Serial No.: MI2008A001066, filed Jun. 13, 2008, which application is incorporated herein by reference in its entirety.

TECHNICAL FIELD

An embodiment of the present disclosure relates to a method for controlling a voltage regulator and a corresponding controller. More specifically, an embodiment of the disclosure relates to a method for controlling a voltage regulator, in particular a converter of the multiphase interleaving type, of the type comprising at least one modulator of the PWM type. The following description is made with reference to this specific field of application by way of illustration only.

BACKGROUND

As it is well known, the development of the electric characteristics of the processors for PC, WORSTATION, and SERVER forces the constructors to search new solutions to meet the conditions required by the Computing Processing Units or CPUs.

In particular, the CPUs of the last generation require a high accuracy of the supply voltage, equal for example to 1.2 V+/−0.8% under steady state and 1.2 V+/−3% under transient conditions.

Beside these requests for accuracy, the used supply voltages may decrease also down to 1.1V and the load currents may increase up to 130 A with rise and fall times reaching 100 A/ms, with request for supply efficiency higher than 80%.

Suitable current or voltage regulator devices are able to ensure the required efficiency. A regulator suitable for the applications with a CPU includes, for example, a converter of the DC-DC interleaving type, used as an economic and efficient solution to meet the above needs realized by connecting in parallel N DC-DC converters in Buck or Step-down configuration, i.e., by connecting together their input and output terminals and driving them in an out-of-phase or interleaved way.

A similar converter of the DC-DC interleaving type is schematically shown in FIG. 1, globally indicated as regulator 1.

The regulator 1 includes a controller 2 coupled to a plurality of n buffers or phases 3 (multiphase configuration) including pairs of switches, so called high-side and low-side switches, driven by the controller 2 so as to supply a required power to a CPU 4 coupled to the output terminal OUT of the regulator 1.

The interleaving driving of the regulator 1 also implies that the controller 2 closes the high-side switches in the n phases with a phase shift equal to the switch period T divided by the number n of the phases.

A regulator 1 of the multiphase interleaving type is shown in greater detail in FIG. 2. In particular, the regulator 1 comprises n phases (indicated in the figure simply by their inductors L1 . . . Ln), each phase 3 comprising a high-side switch SWhs coupled in series with a low-side switch SWls between a first and a second voltage reference, in particular an input voltage Vin and a ground GND.

Each phase 3 also comprises an inductor L inserted between a switch node X, or phase node, intermediate between the switches SWhs and SWls. The regulator 1 also comprises an output capacitor Cout inserted between the output terminal OUT and the ground GND. Across the capacitor Cout there is an output voltage value Vout which is applied to the CPU 4.

The controller 2 supplies a driving signal of the PWM type for the high-side switches SWhs and low-side switches SWls of the phases 3, sensitive to the level of the PWM signal, in particular the high-side switches being on and the low-side switches off respectively if PWM=1, vice versa the high-side switches being off and the low-side switches on if PWM=0. To do this, the controller 2 comprises a suitable modulator 5.

The current specifications that the processors require have been developed in time and during the last years have become more and more pressing and can be summarised in the underlying Table 1:

TABLE 1

|  | 2004A | 2004B | 2004C | 2005A |
|---|---|---|---|---|
| IMAX | 78A | 119A | 112A | 100A |
| ISTEP | 55A | 95A | 89A | 65A |
| Istep/Trise | 69A/ms | 119A/ms | 111A/ms | 217A/ms |
| IDCmin | 5A | 5A | 5A | 5A |
| ITDC | 68A | 101A | 96A | 85A |
| I_RISE | 800 nsec | 800 nsec | TBD/04_A | 310 nsec |

|  | 2005B | 2006A | 2007A |
|---|---|---|---|
| IMAX | 125A | 65A | 75A |
| ISTEP | 95A | 40A/60A | 40A/60A |
| Istep/Trise | 317A/ms | 1200A/ms | 2000A/ms |
| IDCmin | 5A | 5A | 5A |
| ITDC | 115A | 56A | 56A |
| I_RISE | 310 nsec | 50 nsec | 30 nsec |

It is to be noted that the required increases of the maximum currents (IMAX) stopped in 2005 and a decrease thereof occurs in 2006, passing from about 125 A to 65 A. Such a decrease of the maximum current required leads towards designs of regulators using a smaller number of phases with respect to the regulators realized in the previous years.

In parallel, there occurred, however, a very high increase in the transient current rate of the processors (Istep/Trise), which may complicate a lot the design of the DC-DC interleaving converters: the rate value Istep/Trise raises in fact from 69 A/ms (value of 2004) to the value 1200 A/ms of 2006 up to 2000 A/μA in 2007.

In other words, the DC-DC interleaving converters of future generation are required to meet quicker and quicker load variations (so called Load Transients or LTs).

All this implies an increase in the costs of these converters for which increasing the number of output capacities Cout and thus the number n of phases of the converter itself may be necessary to respect the voltage tolerances as required.

In particular, if the number n of phases has been decided according to the efficiency requirements, to the temperature of the components (i.e., reliability), and to the power density, in the coming years the number of phases will be established also according to the required current transient specifications to be met.

Increasing the number of phases is a way for increasing the response speed of the converter.

For variations of currents equal to 70 A in a range of 50 ns for prior supplies, only by using an adequate number of ceramic capacities limiting the current loss of the processor in the first 50 ns of the load variation can these transients be met.

It is to be remembered in fact that a regulator has a band width proportional to n×Fsw, n being the number of phases of the regulator and Fsw the switching frequency of the same, in general about 300 KHz. The response times are then inversely proportional to the band (for example, for n=4 a response time of about 800 ns is obtained).

The regulator and its response speed can then heavily influence the manufacturing cost of the same and the number of electrolytic capacities to be used (which may influence the voltage loss of the processor for longer times than the ceramic capacities).

It is to be remarked that the band width and response speed of the regulator are, however, two indices which no longer operate for brief load variations such as 50 ns or even 30 ns, which can no longer be considered a deviation "of small signal" since the reaction times of the closed-loop system (i.e., the band width) may be greater at least of an order of magnitude.

Solutions proposed by the prior art aim at improving the response times of the controller without affecting its band width.

To do this, the controller is realized by means of a traditional control portion (sized according to the band width and to the Nyquist stability criterion) combined with a control portion of the non-linear type, which acts on the big signal any time a Load Transient LT is detected, as described for example in European patent applications No. EP 1 826 893 and EP 1 826 894, which are incorporated by reference.

A simplified example of this type of known controller is schematically shown in FIG. 3A, globally indicated with 10.

The controller 10 has an input terminal IN receiving an input voltage signal VID, or, more precisely, a regulation voltage being digitally programmed by the processor through digital lines called VID, and an output terminal OUT for its connection to a CPU (not shown since conventional), whereon an output voltage signal Vout is generated.

The controller 10 comprises in particular a first traditional control portion 11 and a second non-linear control portion 12, both coupled to an output stage 13, in turn coupled to the output terminal OUT of the controller 10. More in detail, as it will be clarified hereafter in the description, the second non-linear control portion 12 comprises a detector 14 of Load Transient LT with a corresponding clock signal, while the first traditional control portion 11 comprises a modulator 15 of the PWM type.

In detail, as shown in FIG. 3A, the input terminal IN is coupled, through a first resistor R1, to a first input terminal, in particular non-inverting (+), of a first operational amplifier OA1 of the first traditional control portion 11 having a second input terminal, in particular inverting (−) coupled through a second resistor R2 to a supply voltage reference GND as well as, in feedback through a third resistor R3, to an output terminal of the first operational amplifier OA1. A further fourth resistor R4 is coupled between the first input terminal of the first operational amplifier OA1 and an inner circuit node FBG.

The first traditional control portion 11 also comprises an error amplifier EA having a first input terminal, in particular inverting, coupled to an inner circuit node FB.

Furthermore, the inner circuit node FB is coupled to a second inner circuit node VDRP in turn coupled to a first current generator Gdroop suitable for supplying these nodes FB and VDRP, and thus the first input terminal of the error amplifier EA, with a current value Idroop equal to K*$I_{TOT}$, K being a suitable scale factor and $I_{TOT}$ a total value of current which flows in the inductors of the phases of the converter to which the controller is 10 is coupled.

The inner circuit node FB is also coupled to an inner circuit node COMP in turn coupled to an output terminal of the error amplifier EA, in turn coupled to the modulator 15 of the PWM type.

The first traditional control portion 11 also comprises a first, a second and a third impedance block, $Z_F(s)$, $Z_{FB}(s)$ and $Z_{LTB}(s)$.

The first impedance block $Z_F(s)$ is inserted between the inner circuit node COMP and a common node Xz, this common node Xz being also coupled to the inner circuit nodes FB and VDRP. In particular, the first impedance block $Z_F(s)$ comprises a first capacitor $C_F$ and a resistor $R_F$ inserted, in series with each other, between the third inner circuit node COMP and the common node Xz, as well as a second capacitor $C_H$ inserted in parallel with and coupled between the inner circuit node COMP and the common node Xz.

The second impedance block $Z_{FB}(s)$ is inserted between an inner circuit node DIFFOUT and the common node Xz. In particular, this second impedance block $Z_{FB}(s)$ comprises a capacitor $C_{FB}$ and a resistor $R_{FB}$ inserted, in parallel with each other, between the inner circuit node DIFFOUT and the common node Xz. Furthermore, the second impedance block $Z_{FB}(s)$ is coupled to a first terminal T1 of the output stage 13.

The third impedance block $Z_{LTB}(s)$ is inserted between an inner circuit node LTB and the first terminal T1 of the output stage 13. In particular, this third impedance block $Z_{LTB}(s)$ comprises a capacitor $C_{LTB}$ and a resistor $R_{LTB}$ inserted, in series with each other, between the inner circuit node LTB and the first terminal T1 of the output stage 13.

The inner circuit node FBG is also coupled to a second terminal T2 of the output stage 13.

These inner circuit nodes, FB, VDRP, COMP, DIFFOUT, LTB and FBG, are coupled to a common line indicated with BUS in FIG. 3A.

The second non linear control portion 12 comprises in particular an operational amplifier OA2 having a first input terminal, in particular non inverting (+) coupled to the inner circuit node COMP of the first traditional control portion 11 and receiving therefrom a first voltage signal $V_{COMP}$, a second input terminal, in particular inverting (−), receiving a second ramp voltage signal LTB from the detector 14 of Load Transient LT and an output terminal coupled to a first input terminal of a logic gate PL of the OR type and supplying it with a PWM pulse indicated as PWM_BOOST. The logic gate PL also has a second input terminal coupled to an output terminal of the modulator 15 of the PWM type of the first traditional control portion 11 and receiving therefrom PWM pulses. The logic gate PL has an output terminal coupled to a third terminal T3 of the output stage 13.

In particular, the output stage 13 comprises an inductor L/N coupled to the third input terminal T3 and to the output terminal OUT of the controller 10, the series of a resistor ESR and of a capacitor C0 inserted between this output terminal OUT and a voltage reference, in particular a ground GND, as well as an output resistor R0 inserted between the output terminal OUT and the ground GND, ends of this output resistor R0 being coupled to the first and second terminals, T1 and T2.

Finally, the inner circuit node LTB is input coupled to the detector 14 of Load Transient LT of the second non linear control portion 12.

In this way, the application of a load is detected by the detector 14 of Load Transient LT, which substantially measures the derivative of the output voltage signal Vout. When this occurs, a pulse PWM_BOOST is created, shared by all the phases of the converter whereto the controller 10 is coupled, and of duration proportional to the decrease of the output voltage signal Vout, i.e., depending on the action of the first traditional control portion 11.

The action of the first traditional control portion 11 is then subjected to a first voltage signal $V_{COMP}$ corrected by a balance control of the inductance currents (current sharing) of the converter phases whereto the controller 10 is coupled, as described in the above indicated patent applications.

In substance, the detector 14 of Load Transient LT zeroes the second ramp voltage signal LTB which, by comparison with the first voltage signal $V_{COMP}$, generates the PWM_BOOST pulse. The PWM_BOOST pulse is added, by the logic gate PL, in OR to the PWM pulses generated by the modulator 15 of the PWM type.

It is to be remembered that these PWM pulses are generated by the modulator 15 of the PWM type by comparing a control voltage value with a periodic clock signal with frequency Fsw. Normally, the clock signals of the PWM modulators have a triangular shape, this triangular shape being that for which a linear link exists at a first estimate between the voltage value of the control signal and the duty cycle of the generated square wave PWM.

The actions of the first traditional control portion 11 and of the second non-linear control portion 12 of the controller 10 realized according to the prior art are indicated in FIG. 3B by the broken arrow F1 and by the arrows F2 and F3, respectively, the control of the non-linear type acting on the big signal any time a Load Transient LT is detected.

Such a controller 10, like all the so called LTB systems, thus supplies a control action any time a load application or Load Transient LT occurs, thus in a synchronous way with the load frequency (normally indicated with Fload).

However, in applications like DC-DC switching converter, this controller has its own switch frequency, indicated as Fsw.

Thus the frame of the PWM pulses as supplied by the first traditional control portion 11, and in particular by the modulator 15 of the PWM type, which has the frequency Fsw, and those deriving from the second non-linear control portion 12 of the LTB type, which has the frequency Fload, are filtered by an output filter of the converter whereto the controller 10 is coupled and in particular by its output inductance and capacity Lo and Co, as schematically shown in FIG. 4A, where how the frame of PWM pulses reaches the output filter of the converter is shown.

Thus, by considering for example a multiphase converter with N=3 like in the example of FIG. 4A, the frame of the overall PWM pulses has an harmonic content which covers the frequency spectrum from the continuous up to high frequencies (which reproduce the square waves of the PWM pulses).

The output filter of such a converter, in particular a low-pass filter, offers a reduction of the width of these harmonics with a decrease of –40 dB/dec over the filter resonance (which occurs at the frequency FLC=½p sqrt(1/LeqCo) with Leq=Lo/N, N being the number of phases in the converter), as shown in FIG. 4B, where the transfer function of such an output filter is reported, together with the spectrum of the frame of PWM pulses received at the input, having frequency NFsw, equal to that of the output voltage signal Vout.

Thus the harmonics of the spectrum in the output voltage Vout, in the case of the multiphase topology with voltage loop, have content at the generic frequency:

$F_{AV}+=N \times F_{SW}+K_V \times F_{LOAD}$ $F_{AV}+>0$ and where $K_V$ is a positive integer >1

$F_{AV}-=N \times F_{SW}-K_V \times F_{LOAD}$ $F_{AV}->0$ and where $K_V$ is a positive integer >1

Remembering that:

the current sharing control system, which serves to balance the currents in the converter phases, measures the current that flows in each single inductor of these phases and compares it with the mean current. A phase shift of the current of a phase from this mean current thus results in a smaller or greater duty cycle of a PWM pulse of this phase. The current sharing control system does not modify, the spectrum of the PWM pulses, which reach the output low-pass filter, but undergoes a stress at frequency equal to the load frequency Fload due to the reduced gain of such a control system and its reduced band width (about Fsw/5).

the control system of the current sharing observes input variables (the single currents of the inductances) which have, as main harmonic component, the switching frequency Fsw (and not NFsw like the output voltage signal Vout).

The above condition becomes, if referred to the harmonics in the currents in the inductors, thus linked to the current sharing loop of the control for the balance of the currents:

$Facs+=Fsw+K_{CS} \times Fload$ $Facs+>0$ and where $K_{CS}$ is a positive integer >1

$Facs-=Fsw-K_{CS} \times Fload$ $Facs->0$ and where $K_{CS}$ is a positive integer >1

It is immediately verified that the presence of the harmonic components $F_A+$ and $F_A-$, which refer to all the previously calculated harmonics (i.e., Fav+, Fav, Facs+, Facs–), has important consequences in the controller 10, both for the regulation system of the output voltage signal Vout and for the control system of the current sharing.

In particular, so as to persist in the converter, these harmonics do not have to be filtered neither by the regulation circuits of the output voltage signal Vout (which filters over frequencies equal to $NF_{SW}/10$), nor by the control circuit of the current sharing which balances the currents in the inductances (which filters about at frequencies equal to $F_{SW}/5$).

From these values of the cut off frequency of the regulation and control circuits, it is thus derived that the harmonic components $F_A+$(always referred to the previously calculated harmonics, i.e., Fav+, Facs+) do not have any influence in the regulation circuit of the output voltage signal $V_{OUT}$.

The same cannot be said for the harmonic components $F_A-$, in turn referred to the previously calculated harmonics, i.e., Fav–, Facs–. In fact, it is immediately verified that the harmonics which fall down to low frequency remain in the converter comprising the above regulation and control circuits (which have gain) and then modify the value of the output voltage signal and the currents of the inductors of the converter phases. However only the harmonics $F_A-<F_{LC}$ give a phase shift sensitive to the output voltage signal $V_{OUT}$. The worst case is then constituted by the smaller $F_A-$ possible (not negative).

It is thus possible to calculate a limit value of the parameter $K_{CSmax}$, like that value which supplies a minimum but positive harmonic $F_A-$.

In particular, tests conducted, have shown that when the control system of the current sharing does not succeed in equalizing the currents in the N=3 inductors of the converter, beats are created in the output voltage value Vout and in the currents of the inductors themselves.

In the tested example, for $K_V=6$ a harmonic $F_{AV}-$ is obtained at 24 KHz poorly filtered by the output low-pass filter with cut off frequency Flc. It has been verified that it is the control system of the current sharing that does not succeed in equalizing the currents in the N=3 inductors Lo, and for $K_{CS}=2$ there are enormous excursions of the currents at 8 KHz.

These excursions or oscillations at frequencies equal to $F_{AV}$ and $F_{ACS}$, also indicated as beats, create thermal unbalances in the power components of the system which may seriously damage the converter.

Furthermore, it is to be noted that these beats may also be continuous. In this case, the control system of current sharing stops regulating and the currents of the inductances become statically different. This condition corresponds to $F_{ACS}=0$ and is a very dangerous condition since it may damage the converter in a very short time.

It is also immediately verified that the converters without control by means of detector of Load Transient LT have their worst case of missed control of the currents of the inductances for $K_V=1$.

This case $K_V=1$ instead is not present when there is a control system through a detector of Load Transient LT since, for $F_{LOAD}=F_{SW}$, a frame of pulses PWM is obtained, strictly at frequency $F_{LOAD}$ and synchronous, for all the phases, as previously explained. By erasing the frame PWM at switching frequency $F_{SW}$, beats at load frequency $F_{LOAD}$ are thus no longer possible, preventing any possible problem of current sharing.

This occurs since, further to the detection of the application of the load or Load Transient LT, the control action should pass from the first traditional control portion 11 to the second non-linear control portion 12. It thus inhibits for a masking time $T_{MASK}$ the passage of the PWM pulses. After the pulse PWM_BOOST in all the phases the passage of pulses PWM coming from the first traditional control portion 11 is inhibited again within the masking time $T_{MASK}$ to allow the recovery of the steady-state working conditions and to avoid an excessive consumption of energy, as schematically shown in FIG. 4C.

This technique, called "body-brake" or LTB_BRAKE, is used in case of release of the load itself and is described for example in the U.S. Pat. No. 6,806,689. A method for controlling a converter of the multiphase interleaving type which uses the body-brake technique provides that under release conditions of the load, all the high-side and low-side switches are turned off (while traditionally, i.e., in the case of controllers which do not use this body-brake technique, the controller would turn off the high-side switches but would turn on the low-side SWIs switches).

In this way the overshoot of the output voltage signal Vout further to the release of the load is widely decreased with respect to controllers which do not use this body-brake technique. In fact, the excess of charge dQ generated by the annulment of the currents of the inductors L of the phases of the multiphase interleaving converter is decreased thanks to the presence of turned off low-side switches.

For a masking time $T_{MASK}$ equal to $1/(NF_{SW})$, when $T_{LOAD}<T_{SW}$, a single pulse PWM_BOOST is present, equal to $T_{LOAD}/2<2T_{SW}/N+V_{OUT}/V_{CC} \times T_{LOAD}$ i.e., at frequency $F_{LOAD}>0.5NF_{SW}/(2+N*D)$ with $D=V_{OUT}/V_{CC}$ For example, for $F_{SW}=300$ KHz, $V_{CC}=12V$, $V_{OUT}=1.4V$, N=3, it is obtained that for $F_{LOAD}>200$ KHz, the frame of the pulses PWM coincides only with the pulses PWM_BOOST, being composed only of pulses at $F_{LOAD}$ and thus, for $F_{LOAD}>200$ KHz, beats cannot be present.

In substance, under conditions of applications of the load or load transient LT at high frequency, the multiphase converters have dangerous oscillations or beats of the currents in the phases, which may cause the increase of the electric and thermal stress of the power components comprised therein, negatively influencing the reliability of the converter as a whole.

In fact, during quick load transients, these devices are not only requested to regulate the voltage supplied, but also to control the currents of the single phases and their correct current sharing. As indicated above, this current sharing is well controlled for values of the load frequency Fload lower than the switching frequency $F_{SW}$ of the converter, while strong oscillations or beats of these currents are observed when the load frequency Fload gets near to the switching frequency $F_{SW}$, these beats introducing additional electric stresses, for example in relation to the peak current of the power MOS transistors or to the magnetic saturation of the cores of the inductors.

It is also evident, as per what was explained above in relation to the solutions realized according to the prior art, that the introduction of a low-pass filter at the output of the converter does not eliminate these beats, in particular under the above-analyzed boundary-frequency conditions.

SUMMARY

An embodiment of the present disclosure is a control method, and a corresponding controller, for a converter, in particular of the multiphase interleaving type, able to eliminate the beats at dangerous frequencies for the stability of the converter as a whole and having such structural and functional characteristics as to overcome the limits and drawbacks still affecting the converters realized according to the prior art.

An embodiment of the present disclosure provides a frequency modulation phase, by means of a suitable modulating frequency and a suitable modulation index, to minimize the entity of harmonics which are generated at particular frequencies, in particular at the switching frequency $F_{SW}$ of the converter. In practice, as it will be evident hereafter in the description, an embodiment of the disclosure is a method for controlling beats introduced by quick load variations or load transients LTs for any frequency value.

An embodiment of a method for controlling a voltage regulator, in particular a converter of the interleaving multiphase type, of the type comprising at least one modulator of the PWM type, includes the steps of:

1) generation of a control voltage signal for said PWM modulator;
2) frequency modulation of said control voltage signal obtaining a modulated control voltage signal having a harmonic at a switching frequency of said voltage regulator of reduced entity with respect to said control voltage signal; and
3) application of said modulated control voltage signal to said PWM modulator for generating a driving signal for said voltage regulator.

An embodiment of a voltage regulator of the type comprising at least one modulator of the PWM type includes an oscillator having an output terminal coupled to said PWM modulator suitable for applying a frequency modulation to said PWM modulator.

BRIEF DESCRIPTION OF THE DRAWINGS

Characteristics and advantages of the control method and of the regulator according to at least one embodiment of the disclosure will be made hereafter in the description of embodiments given by way of indicative and non-limiting example with reference to the annexed drawings.

DETAILED DESCRIPTION

An embodiment of the present disclosure starts from the consideration that the beats in response to quick load variations (indicated as load transients) applied to a voltage regulator, and in particular to a converter of the multiphase interleaving type, are mainly linked to the characteristics of the modulation PWM used therein.

In particular, an embodiment of the present disclosure proposes a method for controlling a voltage regulator suitable for eliminating the beats at particular frequencies, in particular at frequencies $F_{AV}$ and $F_{ACS}$, which have proved to be dangerous for the stability of the regulator itself, as previously shown.

The regulator devoid of these beats may benefit from the reliability point of view.

According to an embodiment of the disclosure, the controlled method proposed reduces or eliminates the beats in a general sense, i.e., for any value of $K_V$, $K_{CS}$, N and not only in the worst case identified in $K_V=1$ realizing a real control of these beats.

According to an embodiment of the disclosure, a method is proposed for controlling a voltage regulator by using at least one modulator of the PWM type coupled to the regulator and supplying it with a driving signal, the method including the steps of:
1) generating a control voltage signal for the PWM modulator;
2) modulating in frequency the control voltage signal obtaining a modulated control voltage signal having harmonics at a switching frequency $F_{SW}$ of the regulator of reduced entity with respect to the control voltage signal; and
3) applying the modulated control voltage signal to the PWM modulator for generating the driving signal for the voltage regulator.

In particular, as described in relation to the prior art, the driving signal allows the turn-on and/or the turn-off of the N phases of the regulator coupled to the PWM modulator.

According to an embodiment of the disclosure, the method uses a frequency modulation which is carried out with a modulating frequency $F_M$ and a modulation index for minimizing the entity of the harmonic at the switching frequency $F_{SW}$, in a similar way as to the above described mechanism LTB which acts in the case K=1 erasing the pulses PWM at the switching frequency $F_{SW}$.

In particular, the modulation index m is given by $dF/F_M$, dF being the maximum frequency/phase shift in the modulation FM with respect to the nominal frequency, in this case Fsw.

Figure 1:
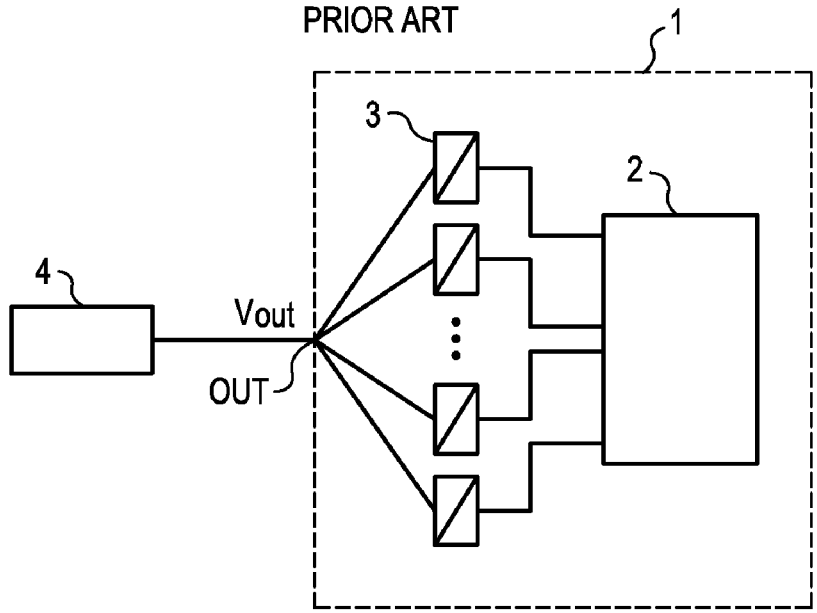
FIGS. 1 and 2 show a converter of the multiphase interleaving type realized according to the prior art.
Figure 2:
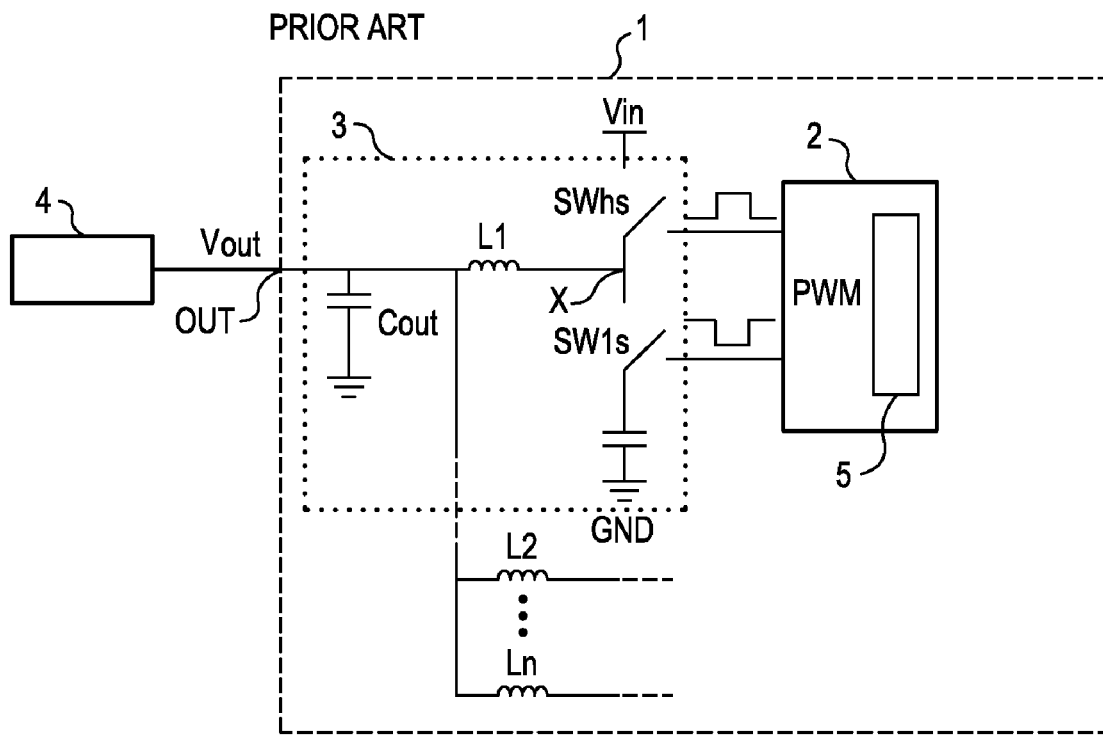
Figure 3A:
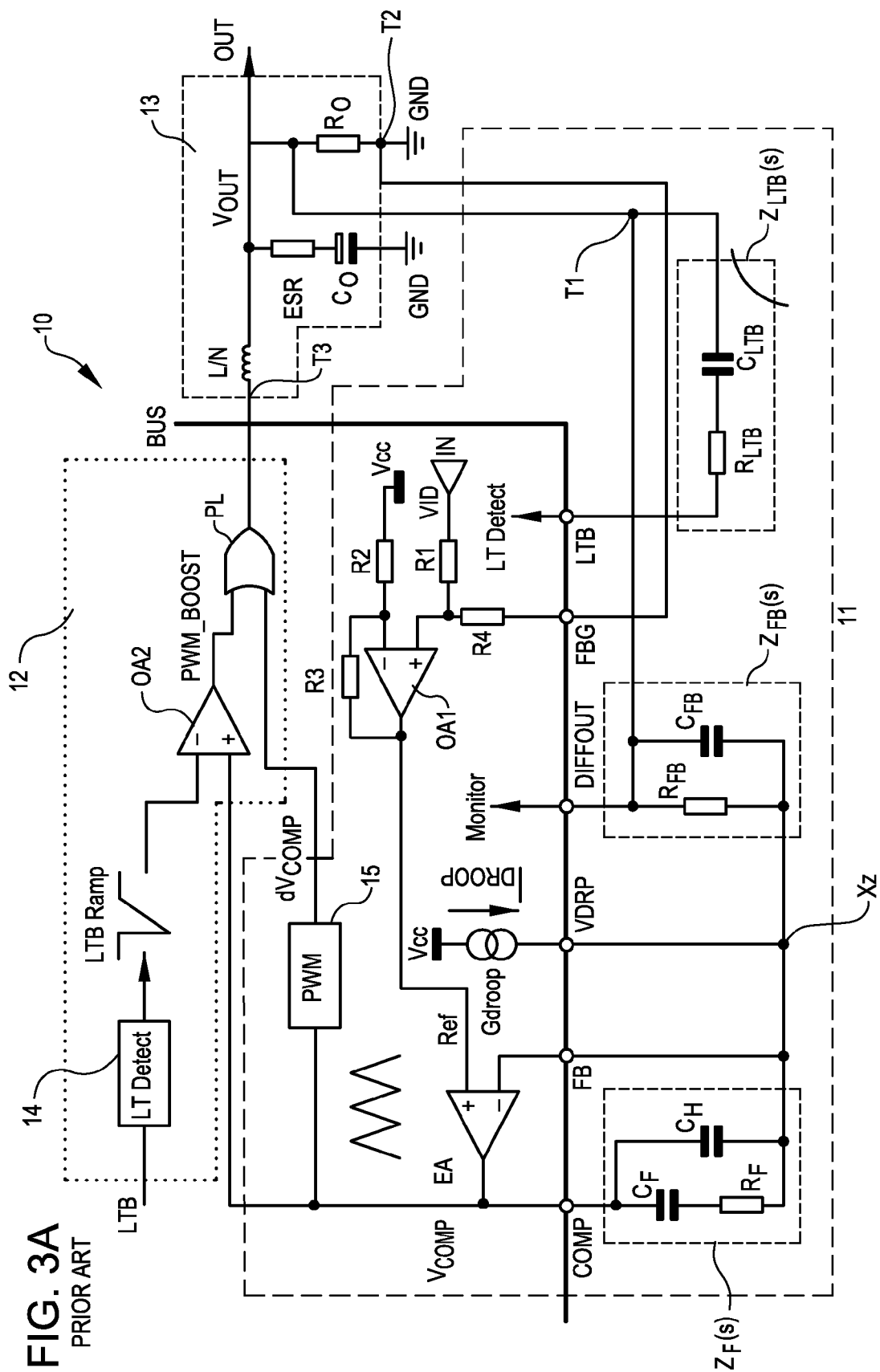
FIGS. 3A and 3B show a controller in a converter of the multiphase interleaving type realized according to the prior art.
Figure 3B:
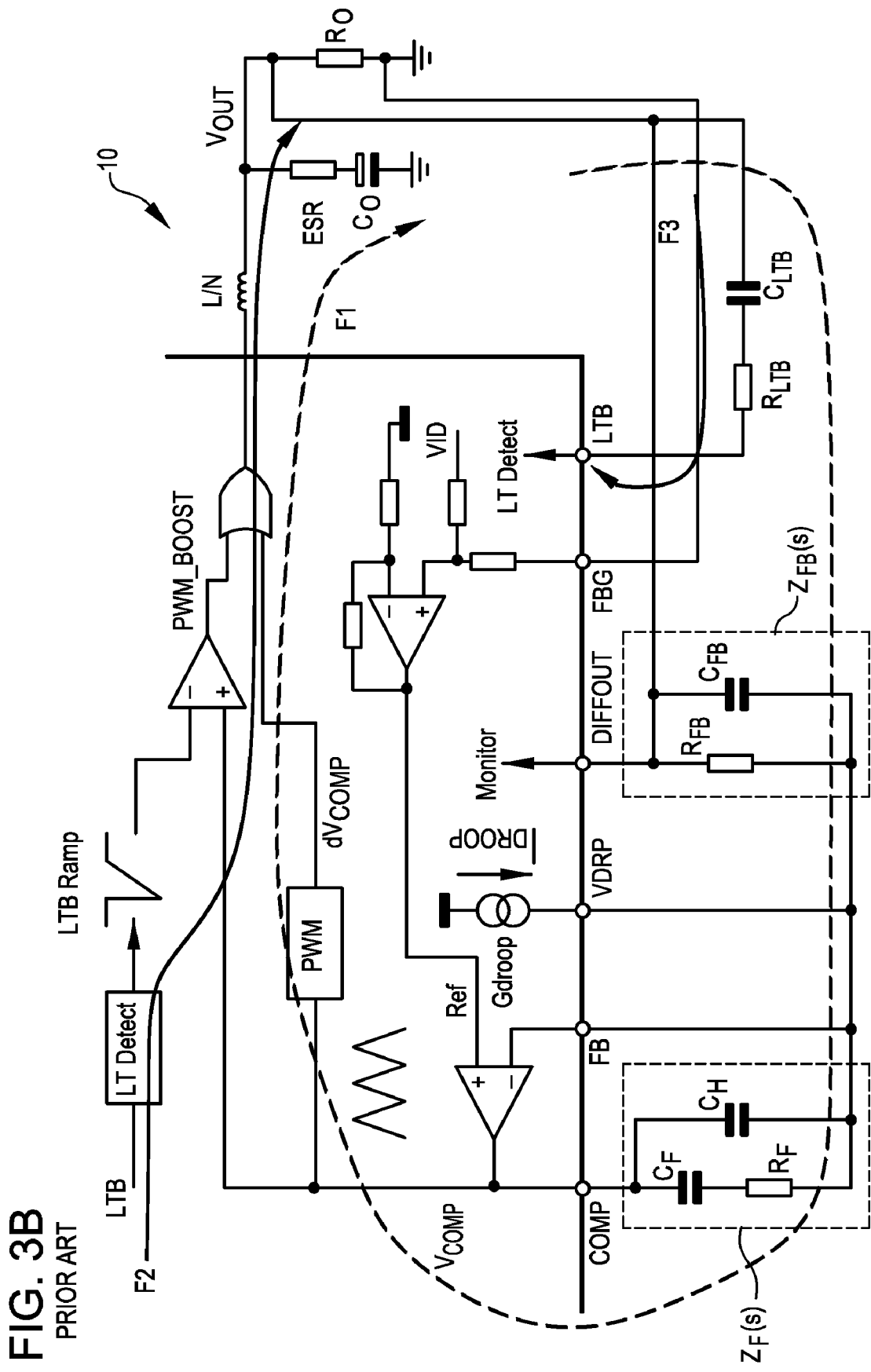
Figure 4A:
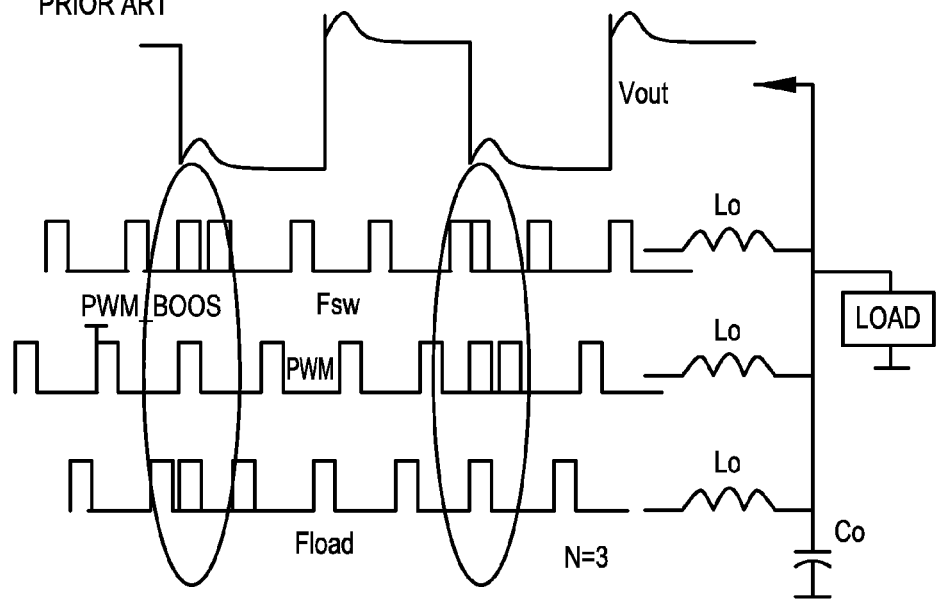
FIGS. 4A-4C show the pattern of inner signals of a converter of the multiphase interleaving type realized according to the prior art.
Figure 4B:
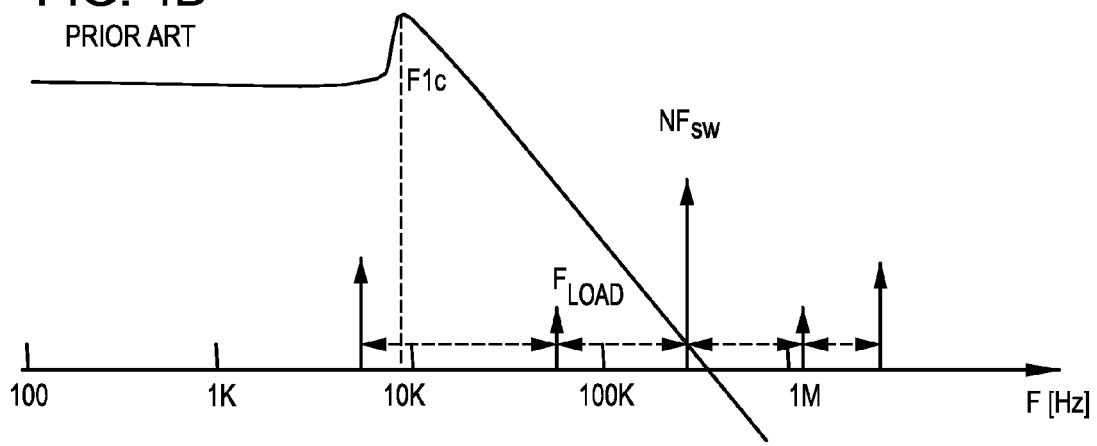
Figure 4C:
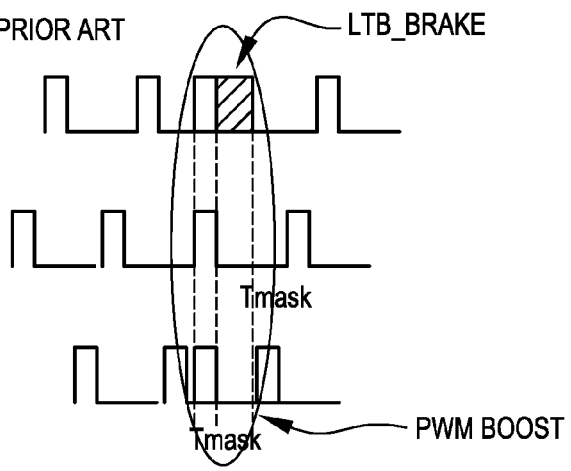
Figure 5A:
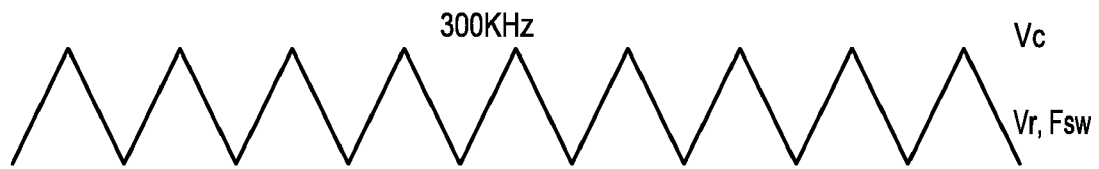
FIGS. 5A-5C show the pattern of clock signals generated according to a control method according to an embodiment of the disclosure.

In substance, with respect to the traditional PWM modulator which receives the control voltage signal Vc and compares it with a triangular wave at the switching frequency $F_{SW}$ of the regulator, as schematically shown in FIG. 5A, in a method according to an embodiment of the disclosure, a PWM modulator compares the control voltage signal with a triangular wave form having a carrier equal to the switching frequency $F_{SW}$, but suitably modulated at the modulating frequency $F_M$ by an amount equal to dF.

Figure 5B:
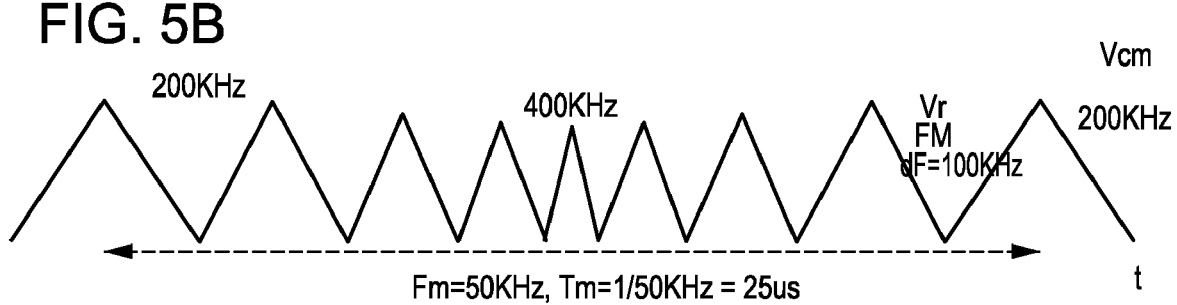

In this way, as schematically shown in FIG. 5B, a modulated control voltage signal Vcm is obtained since the ramp for the modulation PWM, modulated in frequency according to an embodiment of the disclosure, is then compared with the control system, and from the comparison of the two signals the signals PWM will be generated.

By way of example: if $F_{SW}$=300 KHz and $F_M$=50 KHz and m=2 (thus dF=100 KHz) the frequency of the modulated control voltage signal, which has a triangular ramp pattern, sent to the PWM modulator oscillates at a variable frequency whose minimum value is 300 KHz-100 KHz=200 KHz and a maximum value is equal to 300 KHz+100 KHz=400 KHz.

Suitably, the variation from the minimum value 200 KHz to the maximum value 400 KHz occurs cyclically at a modulating frequency $F_M$ equal to 50 KHz.

Figure 5C:
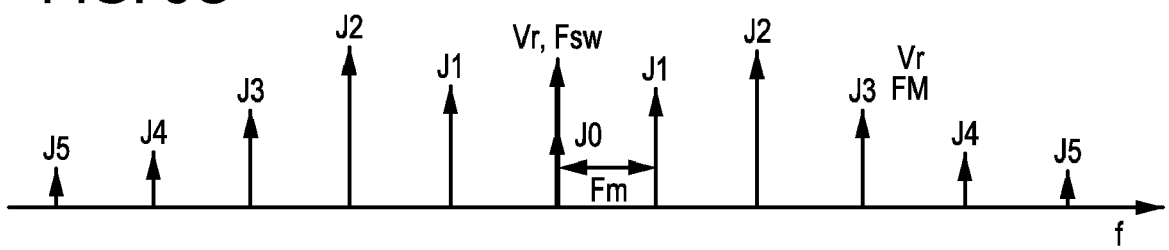

In the Fourier Transform the harmonic content of the traditional triangular wave is represented by the harmonic at the switching frequency $F_{SW}$ (called fundamental or carrier) which concentrates almost all the energy of the signal PWM. In the case of modulation with a modulating frequency $F_M$ of a method according to an embodiment of the disclosure, a lot of harmonics appear all spaced by a value equal to $F_M$ with respect to the carrier $F_{SW}$ and whose intensity is variable according to the Bessel coefficients, indicated as J1, J2, J3, etc., in FIG. 5C. Also in this case, there exists a harmonic at the frequency of the carrier Fsw and characterised by a first intensity Bessel coefficient J0.

Figure 6:
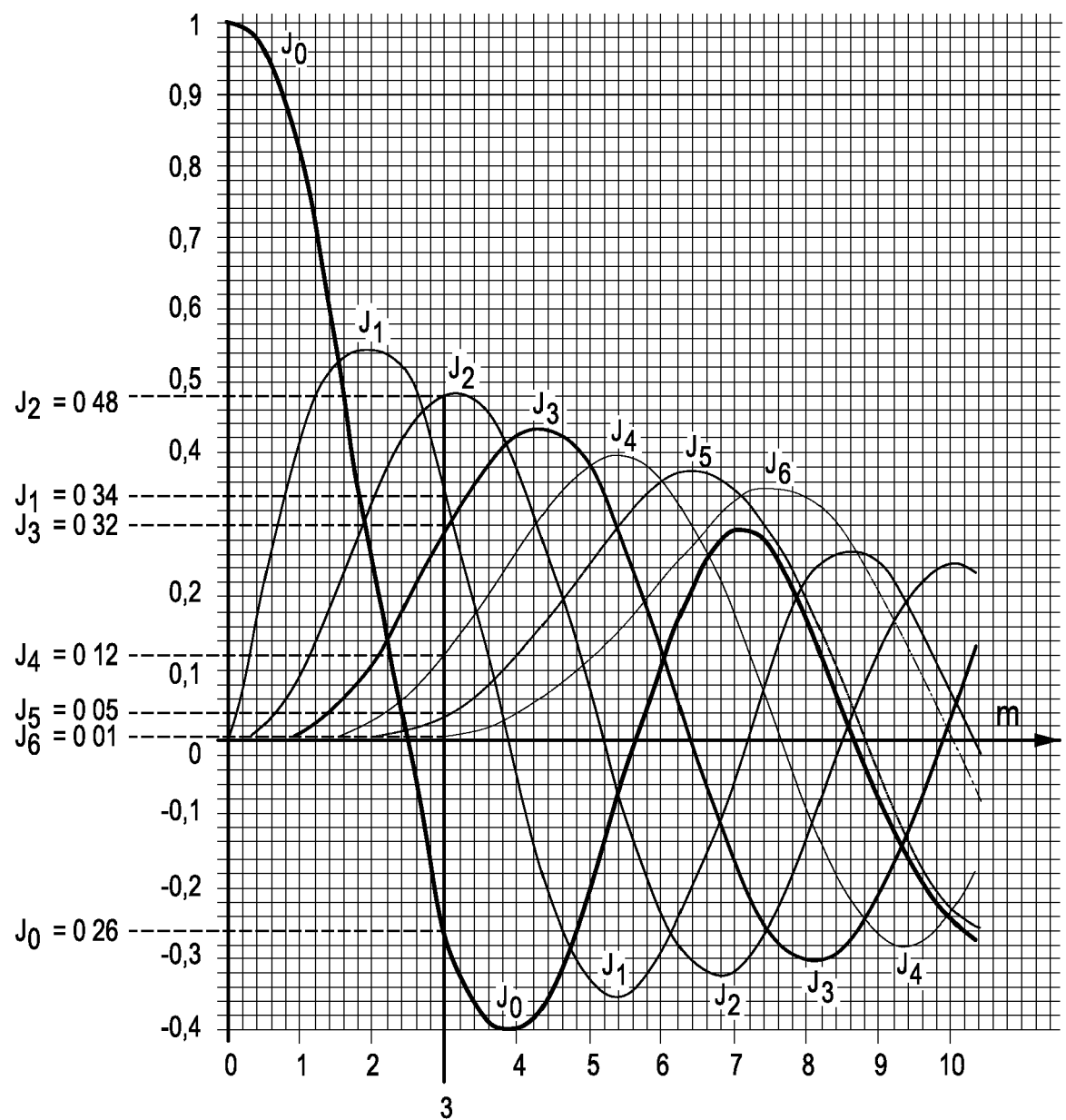
FIG. 6 shows the pattern of intensity coefficients of the Fourier Transform of a modulation FM used by a control method according to an embodiment of the disclosure.

It is also known that the Bessel coefficients Ji follow an oscillating progress decreasing with the modulation index m, as shown in FIG. 6 for a modulation index m=3.

According to an embodiment of the disclosure, the method further provides a calibration step of the modulation in which a target modulation index is identified, indicated with m*, suitable for eliminating the component at the carrying frequency $F_{SW}$ i.e., which nullifies the first intensity Bessel coefficient J0.

In this way, by erasing the width of the fundamental harmonic at the carrying frequency $F_{SW}$ and by using the known current sharing system on the other harmonics resulting from the used frequency modulation, the beats are remarkably reduced on the voltage and current signals with an improvement of the performances of the regulator driven by the driving signal obtained with a method according to an embodiment of the disclosure, besides an increase in its reliability.

In an embodiment, a target modulation index m* which results in J0=0 is equal to 2.4, a value obtained for example by the tables of the Bessel coefficients for the frequency modulation.

Figure 7:
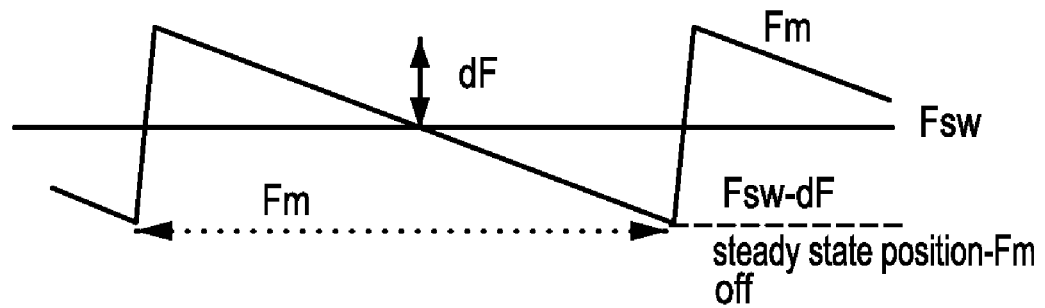
FIG. 7 shows a wave form of a modulation signal used by a control method according to an embodiment of the disclosure.

According to an embodiment of the disclosure, the method also provides that the frequency modulation step of the control voltage signal uses a modulating signal of the triangular type, in particular generated by an oscillator, as shown in FIG. 7.

It is to be noted that this choice is against the current wisdom with respect to the choices made in the traditional frequency modulations, in which the mathematical form with which the modulating varies from −dF to +dF is typically a trigonometric function (sine or cosine). It has been, in fact, verified that the use of the triangular wave of the above-indicated type tangibly improves the response speed within the system and thus goes against a technical prejudice matured in the field.

According to an embodiment of the disclosure, the method also comprises a preliminary step, in turn comprising the steps of:

detecting when a variation of the load applied to an output terminal of the converter occurs (a so called Load Transient); and enabling the frequency modulation only if such a Load Transient LT is present.

In fact, if there are no load applications (i.e., when Fload=0) there is no reason to apply the frequency modulation to the regulator. In particular, FIG. 7, Fsw−dF indicates a rest position with the frequency modulation turned off. Alternately, Fsw may be the rest position with the frequency modulation turned off.

In other words, a method according to an embodiment of the disclosure is carried out only if during an oscillation period at least one load transient LT is registered.

In particular, the step of detecting the load transient comprises a step of detecting the derivative of the output voltage signal Vout of the converter and a step of generating a detection impulsive signal LTPULSE in response to the detection of the load transient.

In another embodiment, the control method also comprises a regulation step of this detection impulsive signal LTPULSE.

Figure 8:
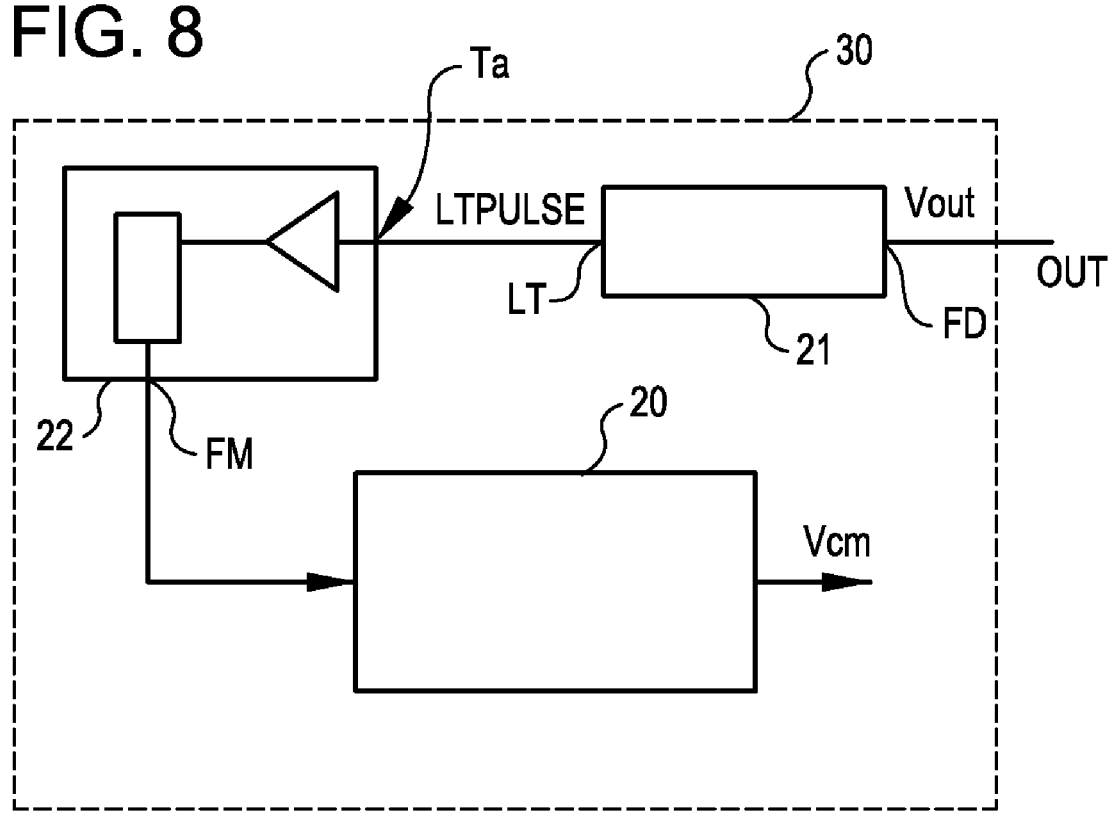
FIG. 8 shows a configuration of a regulator according to an embodiment of the disclosure.

A control method of voltage regulation according to an embodiment of the disclosure is carried out by means of a regulator, schematically shown in FIG. 8 and globally indicated with 30.

The regulator 30 includes a modulator of the PWM type, indicated with 20, as well as a detector of a load transient 21 having an input terminal FD coupled to a terminal OUT of the regulator, for example a converter of the multiphase interleaving type for the connection for example to a CPU.

According to an embodiment of the disclosure, the regulator 30 also comprises an oscillator 22 having an output terminal FM coupled to the PWM modulator 20 and an enable terminal Ta coupled to the load transient detector 21.

As indicated above in relation to a method according to an embodiment of the disclosure, the oscillator 22 applies a frequency modulation with a modulating frequency $F_M$ and a modulation index m to minimize the occurrence/energy of the harmonic at the switching frequency $F_{SW}$ of the regulator 30.

The oscillator 22 is realized by means of a voltage controlled oscillator where the control voltage is the modulating signal at frequency Fm and the maximum frequency variation is equal to dF. The resulting signal is Vcm.

Now are described the operative steps of the regulator 30 according to an embodiment of the disclosure, according with the previously described method.

The load transient detector 21 enables the oscillator 22 only if there is a load transient. In particular, the oscillator 22 is operated only if during an oscillation period at least one load transient is registered by the load transient detector 21.

If no load transients are detected within a time equal to $1/F_M$, then the oscillator 22, once its cycle is completed, stops oscillating. Then, when there are no load transients ($F_{LOAD}=0$) and no frequency modulations, the PWM modulator 20 works in a traditional way receiving a triangular wave at a fixed frequency equal to $F_{SW}$−dF, base level of the modulating signal of the triangular type as indicated in FIG. 7.

Thus, when $F_{LOAD} \geq$ Fm, the oscillator 22 appears not to be related to the repetition frequency of the load Fload. This is a condition of the modulation in an embodiment.

Figure 9A:
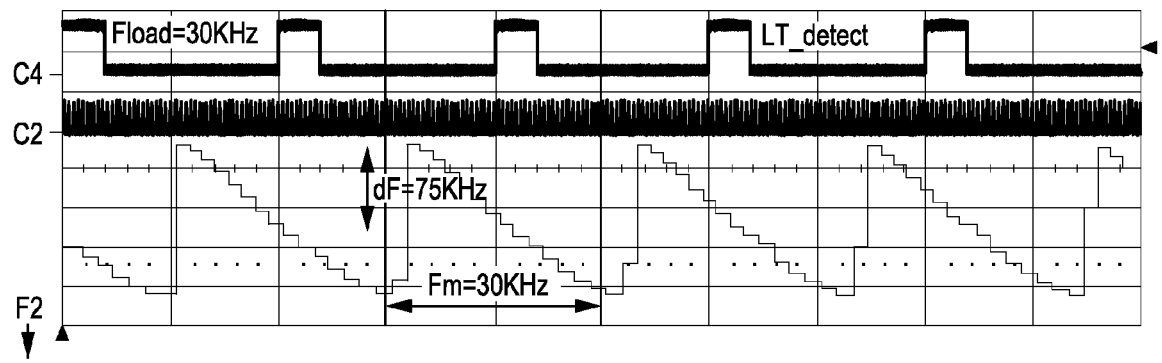
FIGS. 9A and 9B show the pattern of inner signals of a regulator using a control method according to an embodiment of the disclosure.
Figure 9B:
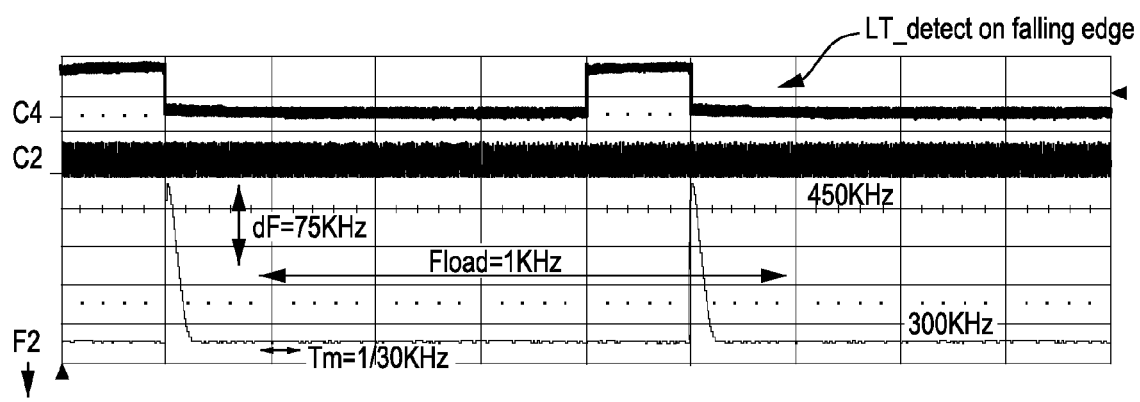

FIGS. 9a and 9b represent the pattern of the frequency of the signal Vcm. If the load frequency Fload is <Fm, then the oscillator 22 returns again to the nominal frequency after a first modulation (FIG. 9b) for then restarting with the second load transient while if Fload>=Fm then the oscillator continues, being related to the load transients generating the real frequency modulation (FIG. 9a shows the situation where the load transients have the frequency Fload=Fm=30 kHz, although the pattern of frequency for Fload>Fm is substantially the same as the pattern of FIG. 9a).

According to an embodiment of the disclosure, if Fload<Fm, then the use of the triangular wave of the above indicated type tangibly improves the response speed of the whole system.

When there is a load transient, a suitable system based on the body-brake technique, indicated as system LTB, responds creating a pulse for the masking of the pulses PWM.

In an embodiment, a multiphase controller is used manufactured by ST with reference L6756 and a modulation entity dF equal to 75 KHz, obtaining a target modulation index m* equal to 2.5 for a modulating frequency $F_M$ of 30 KHz.

Tests have been carried out on these embodiments, the results of which in the case of $F_{LOAD} \geq$ Fm and of $F_{LOAD}<$Fm, respectively, are shown in FIGS. 9A and 9B and show the progress of the frequency of the modulated signal Vcm by means of a saw tooth signal.

These tests have given excellent results, with the control mechanism of the current sharing of the regulator thus obtained which operates thanks to the frequency modulation introduced as discussed above.

In particular, a regulator of the above indicated type has been used with the following values: Fsw=400 KHz, dF=70 KHz, Fm=30 KHz and it has been verified that, even with a load frequency Fload equal to 210 KHz, i.e., under a very critical condition for the beats of the currents, there are no dangerous oscillations of the currents, nor beats on the output voltage of the regulator.

In conclusion, according to an embodiment of the disclosure, a control method allows driving a regulator, in particular a converter of the multiphase interleaving type, so as to reduce the energy of or to eliminate the beats on the voltages and on the currents, also ensuring great reliability to the system thus obtained. This is ensured for load frequencies both greater and smaller than the switching frequency of the regulator.

This result is obtained by using a frequency modulation, suitably activated by the load transients, and applied by an oscillator coupled to the PWM modulator of the regulator.

A power supply as described above may be used in a system, such as a computer system, to power one or more components, (e.g., a CPU) of the system. The supply, or portions thereof, may be on an integrated circuit (IC) chip, and other components of the system, or parts of one or more of these components, may be disposed on the same or different ICs.

Naturally, in order to satisfy local and specific requirements, a person skilled in the art may apply to the embodiments described above many modifications and alterations. Particularly, although one or more embodiments have been described with a certain degree of particularity, it should be understood that various omissions, substitutions, and changes in the form and details as well as other embodiments are possible. Moreover, it is expressly intended that specific elements and/or method steps described in connection with any disclosed embodiment may be incorporated in any other embodiment as a general matter of design choice.

What is claimed is:

1. A method for controlling a voltage regulator having at least one PWM modulator, the method comprising:
   generating a control voltage signal for said PWM modulator;
   frequency modulating the control voltage signal;
   obtaining a modulated control voltage signal having an harmonic at a switching frequency of said voltage regulator, the harmonic exhibiting reduced energy with respect to said control voltage signal; and
   applying the modulated control voltage signal to said PWM modulator to generate a driving signal for said voltage regulator;
   wherein said step of frequency modulation of said control voltage signal is carried out with a modulating frequency and a modulation index calculated to minimize the energy of said harmonic at said switching frequency.

2. The method according to claim 1, further comprising calibrating the modulation step in which a target modulation index is identified being suitable for eliminating a first Bessel intensity coefficient in correspondence with said switching frequency.

3. The method according to claim 2, wherein said calibration uses a target modulation index equal to 2.5.

4. The method according to claim 1, wherein said frequency modulating uses a modulating signal of the triangular type.

5. The method according to claim 4, further comprising:
   detecting when a load transient occurs; and
   enabling said frequency modulation step only in case of a load transient.

6. The method according to claim 5, wherein said step of detecting said load transient further comprises:
   detecting the derivative of an output voltage signal of said voltage regulator; and
   generating a detection impulsive signal in correspondence with said load transient.

7. The method according to claim 6, further comprising regulating the detection impulsive signal LTPULSE.

8. Voltage regulator of the type comprising at least one modulator of the PWM type comprising an oscillator having an output terminal coupled to said PWM modulator suitable for continuously applying a frequency modulation to said PWM modulator at a modulation index suited to reduce harmonics.

9. Voltage regulator according to claim 8, wherein said oscillator applies a frequency modulation with a modulating frequency and a modulation index calculated to minimize the energy of said harmonic at a switching frequency of said voltage regulator.

10. Voltage regulator according to claim 8, wherein it comprises at least one detector of a load transient applied to an output terminal of said voltage regulator.

11. Voltage regulator according to claim 10, wherein said oscillator has an enable terminal coupled to said detector of a load transient.

12. Voltage regulator according to claim 11, wherein said oscillator comprises a voltage controlled oscillator wherein the control voltage is given by the modulating signal.

13. Voltage regulator according to claim 8, wherein said detector is sensitive to a derivative of a voltage signal of an output terminal of said voltage regulator.

14. A power-supply controller, comprising:
   a driver operable to control at least one phase of a power supply in response to a regulated output signal and an oscillating signal; and
   a generator operable to generate the oscillating signal and to modulate the oscillating signal at a modulation index suited to reduce at least one frequency component of the regulated output signal.

15. The power-supply controller of claim 14 wherein the driver comprises a pulse-width modulator operable to generate a phase drive signal having a frequency related to the frequency of the oscillating signal.

16. The power-supply controller of claim 14 wherein the driver comprises a pulse-width modulator operable to generate a phase drive signal having a frequency substantially equal to the frequency of the oscillating signal.

17. The power-supply controller of claim 14 wherein the driver comprises a pulse-width modulator operable to generate a phase drive signal having a duty cycle related to the regulated output signal.

18. The circuit of claim 14 wherein the driver comprises a pulse-width modulator operable to generate a phase drive signal having a duty cycle that is inversely proportional to the regulated output signal.

19. The circuit of claim 14 wherein the generator is operable to modulate the frequency of the oscillating signal according to a periodic signal.

20. The circuit of claim 14 wherein the generator is operable to modulate the frequency of the oscillating signal according to a triangle wave.

21. The circuit of claim 14 wherein:
   the oscillating signal has a steady-state frequency; and
   the generator is operable to modulate the frequency of the oscillating signal with a modulation index that reduces the energy of a frequency component of the oscillating signal at the steady-state frequency.

22. The circuit of claim 14 wherein:
   the oscillating signal has a steady-state frequency; and
   the generator is operable to modulate the frequency of the oscillating signal with a modulation index that substantially suppresses a frequency component of the oscillating signal at the steady-state frequency.

23. The circuit of claim 14 wherein the generator is operable to generate the oscillating signal having a varying frequency in response to the regulated output voltage exhibiting a transient.

24. The circuit of claim 14, further comprising:
   a detector operable to detect a transient in the regulated output signal; and
   wherein the generator is operable
      to modulate the frequency of the oscillating signal for a period of time in response to the detector detecting a transient in the regulated output signal, and
      to generate the oscillating signal having a constant frequency after the period of time has expired.

25. The circuit of claim 14 wherein the regulated output signal comprises a regulated output voltage.

26. The circuit of claim 14 wherein the driver is operable to control multiple phases of the power supply.

27. A power supply, comprising:
   at least one phase for providing a regulated output signal to a load;

a driver operable to control the phase in response to the regulated output signal and an oscillating signal; and a generator operable to generate the oscillating signal having a frequency and to frequency modulate the oscillating signal to suppress at least one harmonic in the regulated output signal.

28. The power supply of claim 27 wherein the generator and at least a portion of the driver are disposed on a same integrated-circuit die.

29. A system, comprising:

a load; and a power supply coupled to the load, the power supply comprising at least one phase for providing a regulated output signal to the load;

a driver operable to control the phase in response to the regulated output signal and an oscillating signal, and a generator operable to generate the oscillating signal having a frequency and to frequency modulate the oscillating signal to suppress at least one harmonic in the regulated output signal.

30. The system of claim 29 wherein the load and at least a portion of the power supply are disposed on a same integrated-circuit die.

31. The system of claim 29 wherein the load and at least a portion of the power supply are disposed on respective integrated-circuit dies.

32. A method, comprising:

generating a regulated output signal by switching at least one power-supply phase in response to a switching signal having a first frequency;

detecting a change in a load that receives the regulated output signal; and substantially and continuously suppressing a frequency component of the output signal at the first frequency in response to the change.

33. The method of claim 32 wherein detecting a change comprises detecting an increase in the load.

34. The method of claim 32 wherein detecting a change comprises detecting a decrease in the load.

35. The method of claim 32 wherein substantially suppressing the frequency component of the switching signal at the first frequency comprises:

varying the frequency of the switching signal over a range of frequencies; and substantially suppressing the frequency component at the first frequency while varying the frequency of the switching signal.

36. The method of claim 32 wherein substantially suppressing the frequency component of the switching signal at the first frequency comprises:

varying the frequency of the switching signal over a range of frequencies that includes the first frequency; and substantially suppressing the frequency component at the first frequency while varying the frequency of the switching signal.

37. The method of claim 32 wherein substantially suppressing the frequency component of the switching signal at the first frequency comprises linearly modulating the frequency of the switching signal.

38. The method of claim 32 wherein substantially suppressing the frequency component of the switching signal at the first frequency comprises linearly modulating the frequency of the switching signal over a range of frequencies that includes the first frequency.

* * * * *